United States Patent [19]

Rough

[11] 4,187,453
[45] Feb. 5, 1980

[54] ELECTRIC MOTOR DRIVE SYSTEM

[75] Inventor: J. Kirkwood H. Rough, Palo Alto, Calif.

[73] Assignee: Jim Zegeer, Alexandria, Va. ; a part interest

[21] Appl. No.: 685,482

[22] Filed: May 11, 1976

Related U.S. Application Data

[63] Continuation of Ser. No. 538,979, Jan. 6, 1975, abandoned.

[51] Int. Cl.² ............................................. H02K 41/02
[52] U.S. Cl. ........................................ 318/135; 310/2; 310/13; 319/49
[58] Field of Search .................................... 310/12-14, 310/49, DIG. 6, 268, 207, 179, 154; 318/135; 335/303

[56] References Cited

U.S. PATENT DOCUMENTS

| | | | |
|---|---|---|---|
| 3,084,420 | 4/1963 | Burr et al. | 310/268 |
| 3,093,762 | 6/1963 | Henry-Baudot | 310/268 X |
| 3,097,319 | 7/1963 | Henry-Baudot | 310/179 |
| 3,109,113 | 10/1963 | Henry-Baudot | 310/13 |
| 3,109,114 | 10/1963 | Henry-Baudot | 310/154 X |
| 3,136,934 | 6/1964 | Henry-Baudot | 310/12 UX |
| 3,144,570 | 8/1964 | Crowley | 310/13 |
| 3,257,586 | 6/1966 | Steingroever | 335/303 |
| 3,259,768 | 7/1966 | Burr | 310/13 |
| 3,312,846 | 4/1967 | Henry-Baudot | 310/268 X |
| 3,699,371 | 10/1972 | Henry-Baudot | 310/207 |

FOREIGN PATENT DOCUMENTS

1363416  5/1964  France ....................... 310/12

*Primary Examiner*—Donovan F. Duggan
*Attorney, Agent, or Firm*—Jim Zegeer

[57] ABSTRACT

There is disclosed a low mass, low inertia, low inductance armature motor having infinite point resolution and a high force to mass ratio. The basic configuration is a plurality of phase displaced armature windings 90° phase displacement for even spaced increments and optimized linear force preferably on a non-conductive, non-magnetic substrate and sandwiched between an incremental, alternately polarized magnetic field or castellated single polarity pole structure. Each of the phase displaced windings is preferably driven by a simplified totem pole type switching circuit. As a result of the low mass, low inertia, low inductance construction of the armature, greater than one thousand start/stop operations per second are made possible with a high force to mass ratio to permit driving and positioning of loads such as thermal print head drives for line printers, thin film read/write head positioners for both solid and floppy disk memory systems, pen positionings for high speed chart readouts, drives for focal plane shutters and cameras, etc. and the capability of being driven in a loop continuously by terminating the multiple phase windings of the armature at conductor ends on lateral edges of the substrate which may be flexible or rigid.

23 Claims, 23 Drawing Figures

ELECTRIC MOTOR DRIVE SYSTEM

This is a continuation, of application Ser. No. 538,979, filed Jan. 6, 1975 now abandoned "ELECTRIC MOTOR DRIVE SYSTEM"

BACKGROUND OF THE INVENTION

This invention relates generally to an improved electric drive, and more particularly to a unique method and apparatus for providing magnetic drive detents in electric motors.

Motors incorporating the present invention have low mass, low inertia, low inductance or non inductive armature (non-ferrous air coil) which thereby permits high switching speeds.

The basic configuration for an electric drive according to the present invention is at least a pair of serpentine conductor members, constituted by windings or conductor elements having at least active portions, transverse to the direction of movement, sandwiched between an incremental alternately polarized or castellated permanent magnetic structure. Each of the phases of the windings is energized by phase displaced currents to establish magnetic driving detents between respective active portion traversals of the conductors with respect to the selected axis and the magnetic field-forming magnet structure. In a preferred embodiment, the serpentine conductor elements are printed on a nonconductive substrate and the stator magnetic fields are formed of high strength permanent magnets.

As used herein, the term "magnetic detent" means the combination of a pair of polarized magnetic fields, one of which is produced by permanent magnets and the other which is produced by one run or one active portion of an armature winding or the combined activations of two or more windings. The term "attractive magnetic detent" means the combination of one magnetic field with a second magnetic field such that the two fields draw towards or are attracted to one another. The term "repulsive magnetic detent" means the combination of one magnetic field with a second magnetic field such that the sources of two fields repel or are repulsed relative to each other. As used herein the term "printed circuit" includes all conductor elements formed by techniques for forming conductive metal conductors on a substrate.

The above and other objects, advantages and features of the invention will become more apparent when considered with the following specification taken in conjunction with the accompanying drawings wherein:

DESCRIPTION OF THE DRAWINGS

FIGS. 10A and 10B show a cylindrical arrangement of a printed circuit armature and FIG. 11B shows the armature in relation to the permanent field magnet structure;

Figure 1:
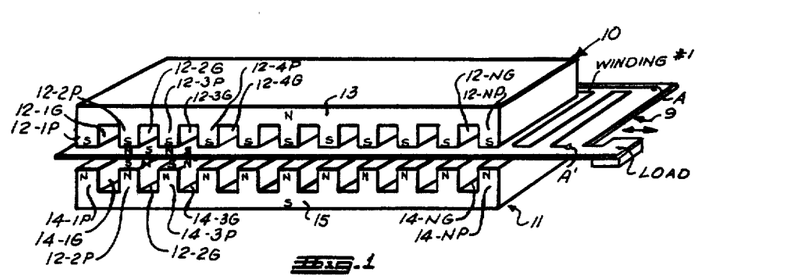
FIG. 1 is an isometric view, somewhat diagrammatic in form, showing one embodiment of the invention wherein the magnetic field structure is gapped or castellated and adjacent magnetic fields are of the same polarity.

Referring firstly to FIG. 1, one preferred embodiment of the invention involves the utilization of attractive and repulsive magnetic detents as defined earlier herein. Such embodiment is illustrated in relation to a flat, rigid printed circuit substrate as a carrier for the windings, but it will be appreciated that this preferred embodiment is likewise applicable to a carrier for the armature conductor windings which is a relatively flexible printed circuit board. The basic function of the carrier is to maintain positional integrity of the active portions of the serpentine conductor members.

As illustrated in FIG. 1, a pair of magnetic castellated elements 10 and 11 are provided with a space between them through which passes the armature 9. The top magnetic element has a plurality of "south" (S) poles 12-1P, 12-2P . . . 12-NP separated by gaps or spaces 12-1G, 12-2G . . . 12-NG, and a common "north" (N) pole portion 13. The bottom permanent magnet structure 11 is constituted by a like number of "north" (N) pole portions 14-1P, 14-2P, 14-3P and 14-NP separated by gaps 14-1G, 14-2G . . . 14-NG, which are aligned with the upper south (S) pole elements 12-1P, and gap 12-1G, respectively, 12-2P, 12-2G, respectively, . . . and 12-NG, 12-NP, respectively. The bottom permanent magnet structure 11 has a common south pole "S" 15 which is denoted by the numeral 15. The field magnet arrangement shown utilizes a return path, or keeper, (not shown) from the top magnetic north pole 13 to the bottom magnetic south pole 15. It will be appreciated that the terms "top" and "bottom" refer to the orientation of FIG. 1, since these could be vertical or any other orientation.

Figure 2:
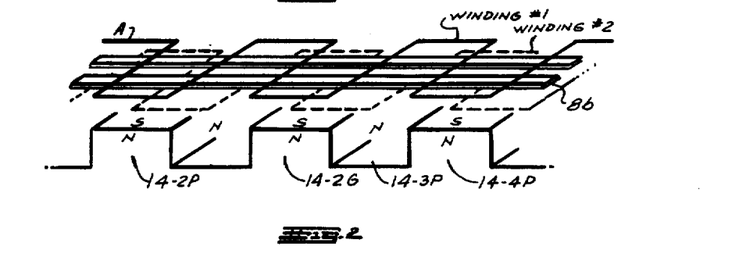
FIG. 2 is an enlarged explanatory view of a portion of the embodiment shown in FIG. 1.
Figure 3:
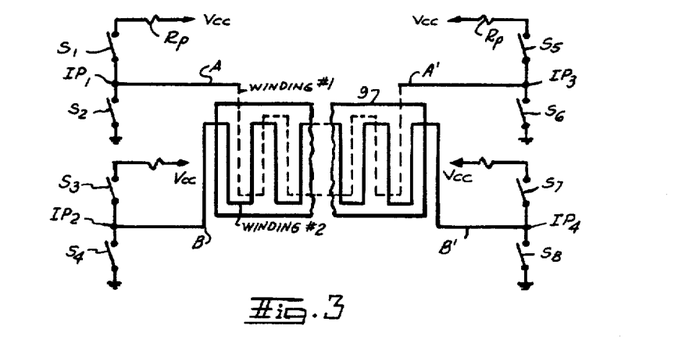
FIG. 3 shows a simplified power supply system for a pair of phase displaced armature windings incorporated in the invention.

Armature 9 has at least a pair of phase displaced serpentine windings, labeled winding #1 and winding #2 in FIGS. 2 and 3, on a non-magnetic carrier or substrate 8, which can be laminated phenolic board, fiberglass, glass, ceramic or plastic. In the isometric explanatory showing of FIG. 2, the carrier 8 is depicted as a pair of spaced rods or frame members 8A and 8B. In the embodiment illustrated in FIG. 1, the elongated active portions of the windings, when energized, will align themselves up parallel to the elongated portions of the magnetic field structure.

The gap between the top and bottom magnet structures 10 and 11 may be just sufficient to pass the armature, and, in fact, with an insulating layer on windings #1 and #2 can be used to support the armature. A load is shown connected directly to the armature 9.

In FIG. 3, windings #1 and #2 are illustrated connected to an electrical supply system constituted by a direct current supply Vcc, and switches $S_1$, $S_2$, $S_3$, $S_4$, $S_5$, $S_6$, $S_7$ and $S_8$. Each switch pair, $S_1$-$S_2$, $S_3$-$S_4$, $S_5$-$S_6$, $S_7$-$S_8$ is connected via a small protective resistor Rp across the Vcc supply voltage and common ground and has an intermediate point $IP_1$, $IP_2$, $IP_3$, $IP_4$, respectively, connected to the ends A, B, A', B' of windings #1 and #2, respectively. Switches $S_1$, $S_2$, $S_3$ ... $S_4$ may be manually operated to effect step movement of armature 9 relative to the magnetic field structure. When switch $S_1$ is operated closed, switch $S_6$ is also closed to provide a current path from source Vcc, resistor Rp, switch $S_1$ intermediate point $IP_1$ and end A, through winding #1, end A' intermediate point $IP_3$ switch 6 and ground. After switches $S_1$ and $S_6$ have been opened, switches $S_5$ and $S_2$ may be closed to provide a current path from supply Vcc, resistor Rp, switch $S_5$, intermediate point $IP_3$, end A' winding #1, end A, intermediate point IP, and switch $S_2$ to ground. In this case, the current having reversed direction of flow, the magnetic field around the elongated active portions of winding #1 will reverse. The actuation of switches $S_3$-$S_4$ and $S_7$-$S_8$ for winding #2 will provide, in relation to the active portions of each winding and the magnetic field structure, similar attractive and repulsive detent elements. Thus, referring to in FIG. 2, when current flows from end A' to end A, since the active elongated portions are in a field polarized as shown, there will be a repulsive detent formed so the armature will be driven, by the cumulative repulsive force in effect between each magnetic field pole and elongated active conductor portion.

The motive force produced is related to the field strength of the magnetic fields (fixed and those formed due to the electrical current flow in the active portions) and number of magnetic detents formed.

It will be appreciated that the magnetic field structure shown in FIG. 1 may be provided by a direct current energized electromagnet having castellated pole pieces or faces.

Figure 4:
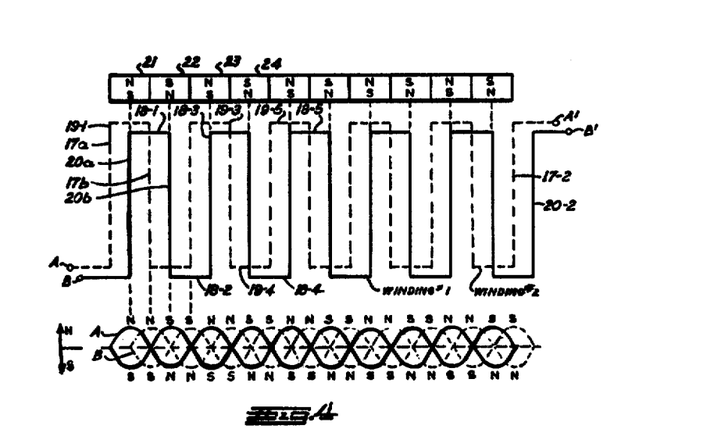
FIG. 4 shows the windings of an armature and the resulting armature field profile and one half of a magnetic field structure.

In FIG. 4, however, the magnetic polarizations are alternated. FIG. 4 shows the top view of windings #1 and #2 of the armature windings which are printed circuit armature windings carried on a non-inductive, low mass substrate. As illustrated, winding #1 of the armature traverses a serpentine path and has active conductor portions 17-A, 17-B which are transverse to the direction of drive or travel designated by the arrows 18, these active portions or segments of the winding #1 including non-active interconnecting end portions 19-1, 19-2 . . . 19-N. It will also be noted that ends A and A' of winding #1 have terminals for receipt of driving voltages or signals to be described later hereinafter.

In like manner, winding #2 has a series of transverse active portions or winding elements 20-A, 20-B . . . 20-Z which are driven by phase displaced voltage pulses by the circuitry to be described later herein. Shown immediately above the windings #1 and #2 is a field magnet structure which has alternate north/south pole elements 21, 22, 23, etc., the relative size of the pole faces of these magnetic elements being related directly to the relative spacing between the segments 17A, 17B and 20A, 20B of the windings #1 and #2 of the armature windings to assure that for the length of the windingmagnetic field structure in the direction of travel, the magnetic detents are effective to provide cumulative increments of force; in other words, the winding spacings are related to the spacings between pole increments such that magnetic detents do not nullify or cancel themselves.

FIG. 4 also shows the armature field profile, the #1 windings being shown in solid lines and the #2 winding field profile being shown in dotted lines and their relative magnetic polarities being indicated on each of the profiles. In the condition shown in FIG. 4, winding #1 is in a stable detent position.

Figure 5:
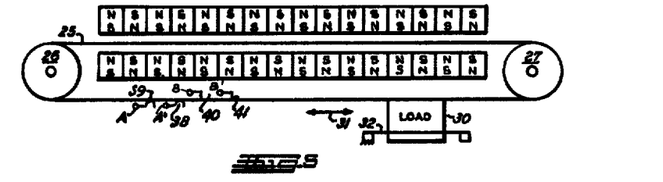
FIG. 5 is a modification on the embodiment shown in FIG. 3 wherein the armature is flexible endless belt printed circuit substrate carrying on opposite sides the phases A and B of the armature winding shown in FIG. 3.

In FIG. 5 there is shown a flexible belt armature circuit carrying thereon the armature winding as shown in FIG. 4 with a flexible, endless belt 25 carrying the armature windings #1 and #2 of FIG. 4. While the armature windings have been shown as carried on opposite faces of the carrier in FIGS. 1–4, it will be appreciated that they may be carried on the same surface with appropriate insulated crossovers.

A pair of pulleys or rollers 26 and 27 journaled in bearings not shown, support the flexible armature circuit 25. In the case of a stepping motor application, the load, indicated generally by the element 30, is connected to the flexible armature circuit and moves in the direction of the arrows 31, the load being constrained for movement in that direction by guide elements 32. The ends A and A' of winding #1 and B and B' of winding #2 may be formed as endless conductive loops at the lateral edges of belt 25.

Brushes 38 and 39 and brushes 40 and 41 connect their respective winding ends A-A' and B-B' to receive electrical operating potentials.

Figure 7:
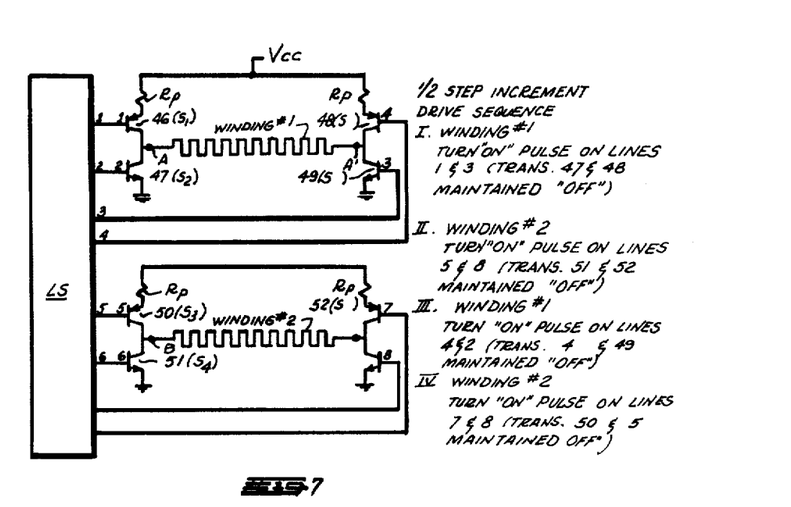
FIG. 7 shows a totem pole driving arrangement for the different phases of two-phase armature winding for a one half step increment drive sequence.
Figure 8A:
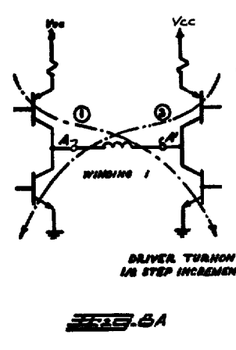
FIGS. 8A and 8B are illustrative circuit embodiments showing the driver turn on sequence for stepping modes for one half step increments with the magnetic poles being one half pole spaced apart and FIGS. 8C and 8D show stepping mode driver turn on sequences for one quarter step movements with the magnetic poles being one quarter pole spaced apart.
Figure 8B:
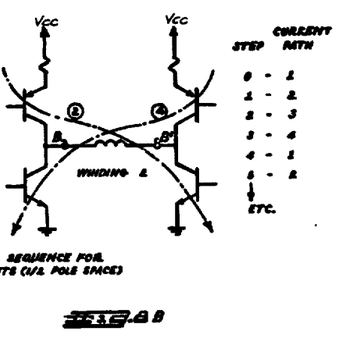
Figure 8C:
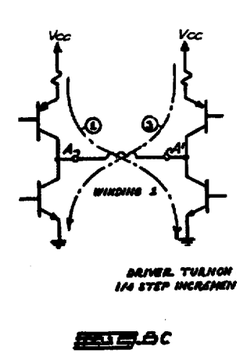
Figure 8D:
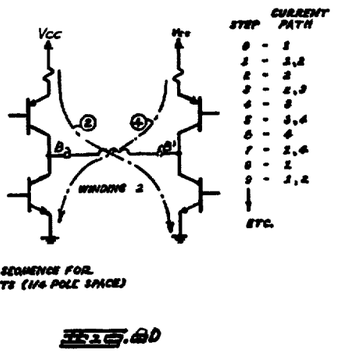

FIGS. 7 and 8A–8D illustrate totem pole transistor switch drive circuits, it being understood that these, while preferred, are merely exemplary driving arrangements for the motor of this invention. As shown in FIG. 7, a source of supply potential 45, denoted Vcc, is connected through a PNP transistor switch 46 to one end of phase winding #1 whereas the opposite end A' of phase winding #1 is connected to a similar transistorized totem pole switching arrangement also connected to the supply 45 through protective current limiting resistor Rp. In addition, the end A of winding #1 is connected through an NPN transistor switch 47 to ground. It will be noted, however, that the opposite end A' is connected to a similar totem pole transistor switch which has a pair of transistor switches 48 and 49 connected through resistor Rp to a supply 45. The intermediate point between transistor switches 48 and 49 is connected to the terminal A' of winding #1. In like manner, the other phase winding #2 has a pair of ends B and B' with the end B connected to the intermediate point of a pair of transistor switches 50 and 51 which is connected through a current limiting resistor Rp to the supply 45. In like manner, the end B of the phase B winding is connected to the intermediate point of a pair of transistor switches 52 and 53 which are connected in series with each other and through a current dropping resistor to the supply 45. Each of the transistors 46, 47, 48, 49, 50, 51, 52 and 53 has the base electrode thereof controlled by an input signal from a logic supply LS. In no case are the two totem pole transistor switches 46-47, 48-49, 50-51 or 52-53 both turned on at the same time. In fact, the arrangement is such that when totem pole transistor switch 46 is turned on, totem pole transistor switch 49 is also turned on to provide a current path through transistor 46 and the terminal A of winding #1 through the terminal A' and the intermediate point between transistors 48 and 49 and transistor 49 to ground. After this turn on sequence has been terminated, transistor switch 48 is turned on along with transistor switch 47 to reverse the relative field and polarity of the field around winding #1. In like manner, the totem pole transistor switch 50 for the phase winding #2 is turned on at the same time a totem pole transistor switch 53 is turned on to provide a current path through the winding #2 from supply 45 through transistor 50, the phase winding #2 and transistor 53. Moreover, a current path is provided from supply 45 through resistor Rp, transistor 52 and the phase winding #2 through transistor 51 to provide a reverse magnetic field. As shown in FIGS. 8A and 8B for a one half step increment (one half pole spaces) the switching sequence arrangement is shown in the schedule as illustrated to the right of these drawings. The different phase current flows for the corresponding to the numbers 1 through 4 of the chart are illustrated on the drawings. As a further example, for a one quarter step increment (one quarter of pole space) the drive turned on sequence is illustrated in the chart to the right of FIGS. 8C and 8D.

As defined earlier herein, the term "magnetic detent" refers to a pair of polarized magnetic fields, and, in a preferred embodiment, one of which is produced by a permanent magnet and the other of which is produced by at least one active portion or run of an armature winding. As also defined earlier herein, the term "attractive magnetic detent" means the combination of one magnetic field with a second magnetic field such that the two fields draw towards or are attracted to one another whereas the term "repulsive magnetic detent" refers to the opposite effect where the two fields are repelled or repulse each other. In the embodiment shown in FIGS. 1-3, when phase winding #1 or #2 is energized, one series of perpendicular fields lines up with the magnetic peaks of the field magnetic structure (in line with the pole faces) to form attractive detents and the alternate perpendicular field, oriented against the field or permanent magnet (in the gaps) repel from the adjacent magnetic peaks and form a repulsion detent. In FIG. 1, this arrangement is illustrated by "N-S" magnetic field between pole faces 12-1P, 14-2P, 12-3P, 14-3P, etc. and by "S-N" between gaps 12-2G, 14-2G, 12-3G, 14-3G, etc. The winding portion of winding #1 forms an attractive magnetic detent whereas the windings of phase winding #2 of the armature windings is energized to have the magnetic pole orientation such that this forms a repulsive detent. The electronics for driving this arrangement is the totem pole arrangement described earlier. This combination of attractive-repulsive detent provides the highest driving force.

The basic configuration described above is for a two-phase printed circuit armature which is on either a stiff or flexible low thermal expansion belt sandwiched between incremented alternately polarized permanent magnetic fields. Different combinations of these arrangements may be utilized, it being understood that combinations of attractive detent arrangements, repulsive detent arrangements, either alone or in combination may be utilized. Every field pole is utilized when the armature is an endless loop or carrier such as a belt or cylinder, although this is not necessary.

Infinite point resolution is easily implemented by driving winding #1 and phase B at 90° out-of-phase using sinusoidal drivers for an analog driving system, or by driving winding #1 and winding #2 90° out-of-phase using a duty cycle modulation in a sine-like function.

Figure 15:
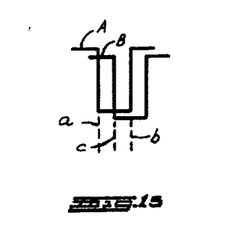
FIG. 15 illustrates diagrammatically the center point of the field generated by the magnet for incrementing to a desired area then selectively adjusting the duty cycle ratio between the winding #1 and winding #2 drives to fine position a selected point by means of adjusting the relative strengths of the magnetic detents.

Thus, referring to FIG. 15, the center point of a field generated at A or B, for instance, may lie exactly between A and B if A and B are driven with the same duty cycle. Therefore, if it is desired, the armature may be increments to the desired area and then on the last cycle, a duty cycle ratio between the drives of winding #1 and winding #2 selected to fine position the armature.

Figure 6A:
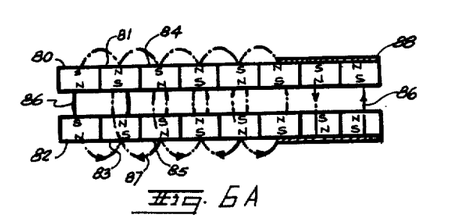
FIGS. 6A, 6B, 6C, 6D and 6E show the field magnet configurations (FIG. 6E showing an example of the field intensity profile for these permanent magnet configurations)
Figure 6B:
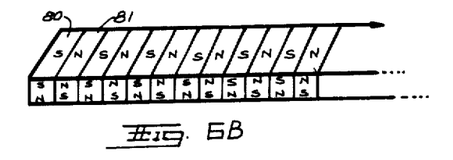

FIGS. 6A and 6B show a plastiform magnet or a solid ferrite magnetic material in which the upper magnetic elements have their south to north poles alternated so each small magnetic element 80 has alternate field polarity to its adjacent magnetic element 81. In like manner, the lower magnetic element 82 has a south to north pole orientation relative to its next adjacent magnetic element 83, such that the fields are additive in adjacent positions. It will be noted that the next succeeding or adjacent magnetic element 84 for the upper element has its poles in the exact opposite orientation to the north/south arrangement of pole elements 81 whereas on the lower structure the element 85 has its pole structure exactly opposite the pole orientation of element 83. Thus, as between elements 80-82 and 81-83, the magnetic field or direction is in the direction indicated by the arrow 86 while the next adjacent orientation of the resulting magnetic field is in the opposite direction as indicated by the arrow 87. These field structures require keeper elements 88 and 89 which are simply magnetic conductor materials which optimize the flux paths as indicated by the arrow 86'.

Figure 6C:
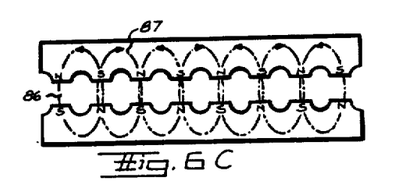
Figure 6D:
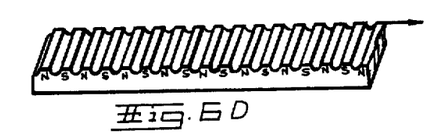
Figure 6E:
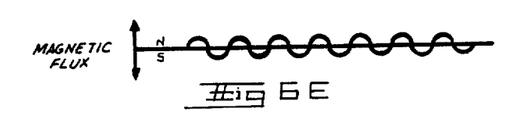

In FIG. 6C, a pair of preformed magnetic field magnets are constituted by a plastiform or solid oriented barium or strontium ferrite magnet having the pole orientation and positions as indicated. In FIG. 6C, a side isometric view of the individual plastiform magnet elements is shown which constitute the individual magnetic elements 80', 82', etc. In FIG. 6D, a side isometric view of the oriented (barium or strontium) ferrite magnetic element is illustrated with the the field intensity profile of these magnets being shown in FIG. 6E. Both of these magnetic structural elements may be used, either in pairs as illustrated or in combinations as by the use of a top set of oriented ferrite magnets as shown in FIG. 6D with a bottom set as shown in FIG. 6C.

A number of commercially available high strength permanent magnet materials can be used, particularly the newer magnet materials constituted by a series of rare earth—cobalt intermetallic compounds RCO$_5$ as sold by Ceramic Magnetics, Inc. of Fairfield, New Jersey. These include, for example, cerium, samarium based magnets which may be molded using powder metallurgical techniques to almost desired configuration. Such materials can be machined, such as by slicing and grinding to obtain pieces with irregular shapes.

While the aforementioned magnetic materials are preferred, other permanent magnets, such as alnico can be used as well as electromagnets mentioned earlier in connection with the castellated magnet structure of FIG. 1.

Figure 9:
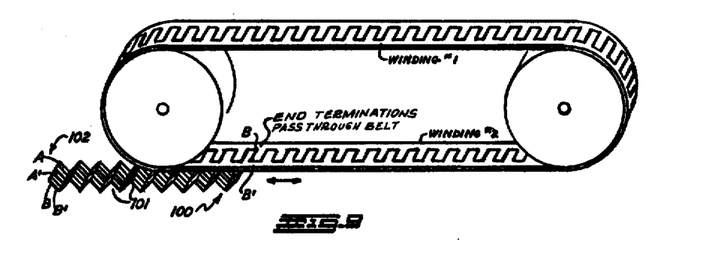
FIG. 9 shows an armature belt arrangement (absent the permanent magnetic structure) with an accordian folded flexible cable termination of the armature windings.

Referring now to FIG. 9, an armature belt arrangement as generally illustrated hereinabove, is shown as having a flexible cable termination for the coil windings. In this arrangement the upper and lower runs of the flexible belt have limited lateral movement to the right and left and the flexible cable termination is shown as having permanent connections to the ends A—A' and B—B' of the different armature phase windings #1 and #2. In the arrangement shown, an accordian fold 100 for the flexible cable strip 101 is shown with the phase A current supply and phase B conductors being denoted by the numeral 102.

Figures 10A, 10B:
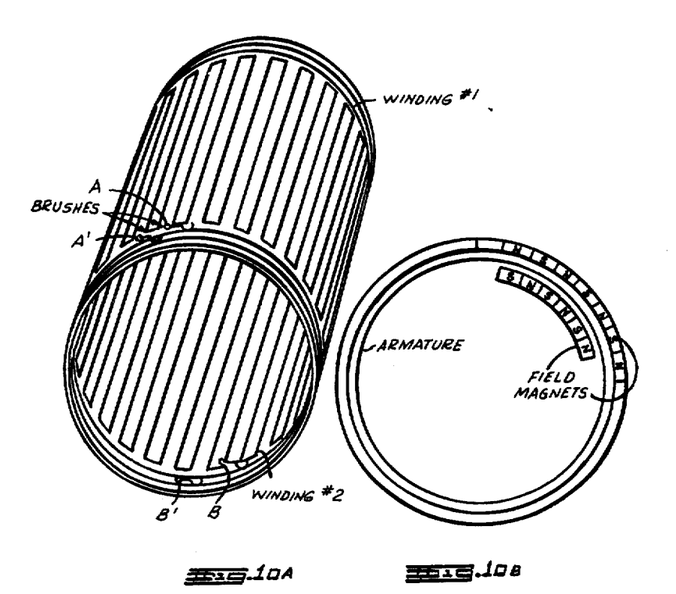

In FIGS. 10A and 10B a printed circuit armature is shown in a form of a cylinder and is illustrated with brushes and/or slip rings for providing driving currents to the phase windings on the armature. In this case, phase winding #1 has its terminal ends brought to a continuous conductive loop at the respective ends of the cylinder, as described with respect to belt 25 in FIG. 5. However, by providing a crossover for one of the ends of the phase windings, both brushes may be connected to the common end. In like manner, the windings #2 are shown having a similar brush-slip-ring arrangement. In the arrangement shown in FIG. 10, the windings #1 are shown on the exterior of the cylinder whereas the windings #2 are shown as being on the interior of the cylinder. These windings then are positioned between the field windings shown in FIG. 10B, it being understood that the north/south poles for the interior permanent magnets may be limited to the extent shown or may extend for the entire circumferential area of the internal and external portions defining the gap in which the cylinder rotates. It will also be appreciated that the armature winding ends A—A' and B—B' may be connected via conventional AC motor slip-rings to provide electrical energy to the windings.

Figure 11:
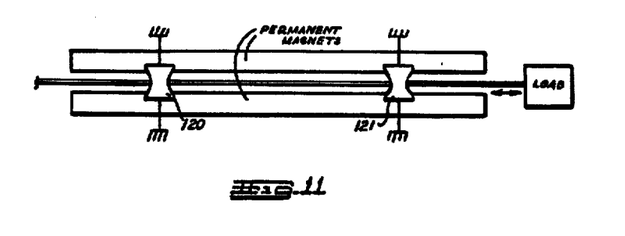
FIG. 11 illustrates a flat printed circuit edge bearing support structure and the connection of the printed circuit element to a utilization device or load.
Figure 13:
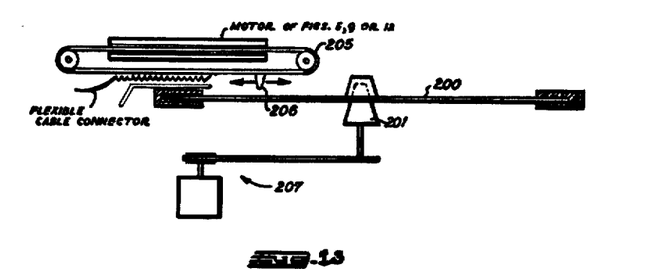
FIG. 13 shows the application of the invention to a floppy disk read/write head positioning arrangement, it being understood that essentially the same arrangement is applied to a solid disk arrangement.

In FIG. 11, a flat, semi-rigid printed circuit board arrangement is illustrated wherein the edges of the printed circuit board are supported between a pair of conical support elements 120, 121, it being understood that each side of the printed circuit board has similar or identical conical supports. In FIG. 13 the invention is shown as applied to a floppy disk read/write head positioning arrangement. In this arrangement, the floppy magnetic disk 200 is supported upon a spindle 201 which is driven by a disk drive-belt motor arrangement 205. The read/write head 206 is connected to a flexible belt armature of the present invention which has a flexible cable connection connected thereto in the manner illustrated in FIG. 9. It will be appreciated that instead of mounting the read/write head directly upon the flexible drive, a gearing arrangement with respect to one of the end cylinders may be provided for directly driving the rear/write head 206.

Figure 14:
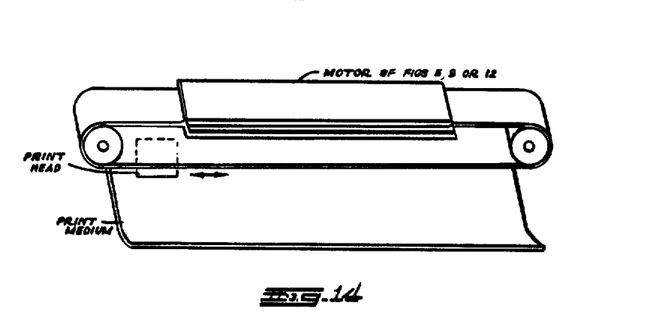
FIG. 14 illustrates the application of the drive arrangement hereof with respect to a high speed chart recorder and pen positioning drive for a thermal printout head.

In like manner, the FIG. 14 illustrates the application of the invention to a high speed chart recorder pin positioning drive or thermal print head positioning drive arrangement. The permanent magnet structure and the flexible belt armature drive system of the invention are schematically illustrated in this drawing.

Figure 12:
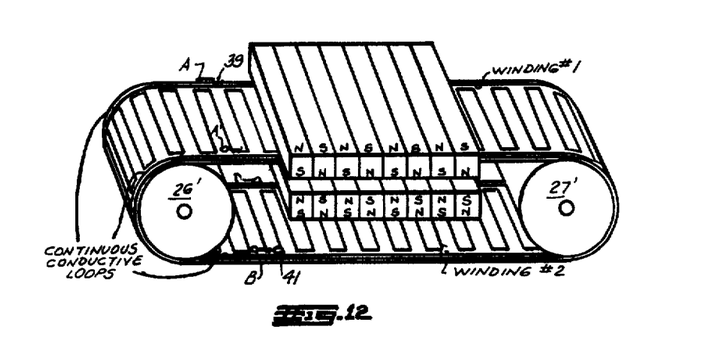
FIG. 12 shows the armature belt arrangement of the invention with the slip ring termination of the coil windings.

In FIG. 12, a brush and slip-ring termination of the armature windings at the lateral ends of a flexible belt has been illustrated. In this arrangement, the armature is on a two layer flexible circuit belt which is supported by a pair of polished cylinders or rollers which may or may not have air bearing surfaces or low mass hollow rollers.

While a major feature and advantage of the invention is a relatively low mass, low inertia motor where the windings are on a movable armature, it is to be understood that the windings may be maintained stationary while the load is coupled to a permanent magnet field structure, to thereby avoid the brushes, flexible cable and slip-rings coupling electrical energy to the ends of the windings. While windings #1 and #2 have been shown as single conductor elements, they may be bifilar.

If closed loop operation is desired, the position of the armature, as well as position changes may be sensed in any number of well known ways and used as a feed back to the source of control signals. For example, the armature substrate can be transparent and a spot of light may be projected through code marks printed thereon to a transducer which supplies its output to the source of control signals, which may be a computer, a typewriter keyboard, etc.

SUMMARY OF THE INVENTION

There has been disclosed an electric motor drive system constituted by a multi-phase printed circuit armature which is on a stiff or flexible low thermal expansion belt which is sandwiched between an incremented, polarized, preferably permanent, magnet field structure, every field pole of the permanent magnetic is utilized in the preferred embodiment. Infinite point resolution is easily implemented by either driving phase winding #1 and phase winding #2 90° out-of-phase using a sinusoidal driver or by driving phase winding #1 and phase winding #2 out-of-phase with pulsers by using a duty cycle modulation in a sine-like function. The printed circuit armature and the phase windings thereon are driven with out-of-phase currents to establish at least magnetic driving detents between respective traversals of the conductors and the selected drive axis and the magnetic field forming members.

Thus, there has been disclosed and described a 1 near motor having a low mass, low inertia, low inductance armature constituted by non-ferrous materials in the form generally of an air coil which thereby permits high switching speeds greater than one thousand start/stop operations per second. Infinite point resolution is provided as to permit positioning of any load device in step-wise fashion and then inbetween steps. Because of the particularly unique application of the attractive-repulsive magnetic detent concept to the driving of the printed circuit armature, a high force to mass ratio is achieved and the system may be an analog or digital drive with open or closed loop operation and easily interfaced with a computer for positioning elements according to computer printout.

Although the application has been disclosed and illustrated with reference to a number of embodiments along with applicant's preferred embodiment, it will be apparent to those skilled in the art that the invention is of wide application and therefore is limited only as indicated by the scope of the claims appended hereto.

I claim:

1. An electric stepping motor comprising,
    a thin, light, non-metallic, non-magnetic carrier member, and means mounting said carrier member for movement in a selected direction of drive,
    a plurality of first conductor members, each of said first conductor members being formed on a surface of said thin carrier member and traversing a path transverse to said selected direction of drive, said first conductor members being spaced a selected distance apart and constituting a first array of active run portions, and first connector means connecting the ends of said active run portions to form a first serpentine winding,
    at least a plurality of second conductor members on a surface of said thin carrier member, each traversing a companion path transverse to said direction of drive and displaced a selected distance with respect to said first plurality of conductors and constituting a second array of active run portions and second connector means connecting the ends of said second plurality of conductor members to form a second serpentine winding separate from said first serpentine winding,
    means establishing a series of incremental polarized magnetic fields arranged along said direction of drive to form magnetic drive detents between the said magnetic fields and said active conductor members upon energization of said conductor members, and
    means connected to the first of said serpentine windings for supplying a first operating current thereto and means connected to the second of said serpentine windings for separately supplying a second operating current thereto.

2. The invention claimed in claim 1 wherein alternate ones of said magnetic drive detents are attractive magnetic detents and the remaining magnetic detents are repulsive detents.

3. In a drive motor system the invention defined in claim 1 said means supplying operating currents to said first and said at least second serpentine windings, including,
    a series connected switch pair having an intermediate point between the switches, there being at least one series connected switch pair for each end of a serpentine winding, with the end of a serpentine winding being connected to said intermediate point, and means supplying control signals to each said series switch pair to control the operation thereof.

4. The invention defined in claim 1 wherein said thin carrier is a flexible endless belt and wherein said conductor members are on opposite surfaces of said flexible endless belt, and means coupling said belt to a load.

5. The invention defined in claim 1 wherein said carrier is a planar relatively rigid support member, said first serpentine winding being a printed circuit winding on one planar surface of said support member and said second serpentine winding being a printed circuit winding on the opposite planar surface of said support member,
    means for supporting said carrier for movement in said direction of drive, and
    means coupling a load to said substrate.

6. The invention defined in claim 1 wherein said first serpentine winding is a printed circuit winding on one surface of said carrier and the other of said serpentine windings is a printed circuit winding on the opposite surface of said substrate with the serpentine path thereof in a 90° phase displaced relationship with respect to the path of said first serpentine winding.

7. The invention defined in claim 6 including a flexible cable termination to each of said serpentine winding ends.

8. The invention defined in claim 7 wherein said flexible cable termination includes means for reducing the loading on said substrate.

9. The invention defined in claim 1 wherein said serpentine paths are phase displaced in their respective traversals by a selected amount and one magnetic detent formed thereby is attractive and at least another one of the magnetic detents is repulsive.

10. The invention defined in claim 9 wherein said phase displacement is 90° for even spaced increments.

11. The invention defined in claim 1 wherein said means for establishing a series of polarized magnetic fields is an assembly of two plastiform magnets spaced apart to define a gap for receipt of said windings.

12. The invention defined in claim 1 wherein said means for establishing a series of polarized magnetic fields is an assembly of individual ferrite bar magnets.

13. An electric stepping motor system, comprising in combination,
    a first thin, non-conductive, non-magnetic carrier element, at least a pair of phase displaced flat conductor members on said first member, each said conductor member having series connected conductor runs traversing a serpentine path and crossing a selected drive axis, said first element having a low mass, low inertia, and low inductance,
    a second element having a series of elongated magnetic field forming members, the direction of elongation of said elongated magnetic field forming members being transverse to said selected drive axis,
    means mounting said first element for step movement relative to said second element, and
    means separately energizing said conductor members with out-of-phase currents to establish at least magnetic driving detents between respective traversals of each of said series connected conductor runs with said selected axis and said magnetic field forming members.

14. A bidirectional electric stepping motor comprising,
    magnetic means forming a linear array of incremental pole magnetic fields, each magnetic field pole increment having one elongated dimension transverse to a selected direction of drive,
    an armature comprising:
    (1) a first winding having at least a pair of serially connected, physically parallel elongated active portions,
    (2) a separate second winding having at least a pair of serially connected, physically parallel elongated active portions parallel to and spaced, in the direction of drive from the elongated active portions of said first winding in said selected direction of drive,
    (3) each said first and second windings have at least a further elongated active portion physically parallel to the other active portion thereof and brought into operative relation to said 14 linear array of polarized magnetic fields upon energization of said first and second windings, (4) a non-magnetic carrier for relative movement with respect to said magnetic means, means for separately energizing said first and said second windings with separate currents to establish at least magnetic driving detents between respective parallel elongated active portions of said windings and said magnetic means forming a linear array of polarized magnetic fields.

15. A method of magnetically driving a load bidirectionally along a selected drive path, comprising, establishing a plurality of consecutive and discrete incremental pole magnetic fields with the lines of magnetic flux thereof encompassing a line extending through said drive path, juxtaposing adjacent said incremental pole magnetic fields at least a pair of serpentine conductor windings, said serpentine windings being spaced relative to each other along the direction of said drive path a selected distance, and separately electrically energizing said serpentine conductor windings in a selected sequence to establish a plurality of cumulative alternate attractive and repulsive magnetic drive detents between the incremental pole magnetic fields surrounding said conductors and said polarized magnetic field for moving said load in one direction and separately electrically energizing said serpentine conductor windings in a sequence reverse to said selected sequence to reverse the direction of drive.

16. The method defined in claim 15, wherein each said conductor traverses a serpentine path transverse to said path of drive, and electrical currents are caused to flow first in one direction and then in the opposite direction in said conductors, respectively, to establish said magnetic drive detents.

17. The method defined in claim 15 wherein the polarization direction of said discrete magnetic fields alternates in sequence.

18. The method defined in claim 15 wherein said pair of spaced conductors are on an endless belt, and including the step of causing successive portions of said conductors to enter said magnetic field and exit same.

19. The method defined in claim 15 wherein electrical energizing current is sinusoidal and 90° out-of-phase in the conductors.

20. The invention defined in claim 14 wherein said magnetic field forming a linear array of incremental pole magnetic fields is a pair of castellated permanent magnet elements spaced apart a short distance to each side of said selected direction of drive, defining a gap for said armature.

21. A method of magnetically driving a load along a selected drive path, comprising, establishing a plurality of consecutive and discrete incremental pole, permanent magnet magnetic fields with the lines of magnetic flux of said permanent magnet magnetic fields encompassing a line extending through said drive path, juxtaposing adjacent said consecutive and discrete incremental pole magnetic fields at least a pair of serpentine conductor windings, said serpentine windings being spaced relative to each other along the direction of said drive path a selected distance, and separately electrically energizing said serpentine conductor windings in a selected sequence to establish a plurality of cumulative alternate attractive and repulsive magnetic drive detents between the magnetic fields surrounding said conductors and said incremental pole magnetic fields for moving said load in a selected direction.

22. The method defined in claim 21 wherein each said serpentine winding is energized with a sinusoidal current, and 90° out of phase with respect to each other.

23. An electric motor comprising, (1) permanent magnet means forming a linear array of incremental pole magnetic fields, each magnetic field pole increment having one elongated dimension transverse to a selected direction of drive, (2) a first winding having a plurality of serially connected, physically elongated active portions, (3) a separate second winding having a second plurality of serially connected, physically elongated active portions, spaced in said selected direction of drive, from the elongated active portions of said first winding in said selected direction of drive, (4) means mounting said permanent magnet means and said first and second windings for relative movement along said selected direction of drive, and (5) means for separately energizing said first and said second windings with separate currents 90° out of phase with respect to each other to establish at least attractive and repulsive magnetic driving detents between respective parallel elongated active portions of said windings and said magnetic means forming a linear array of incremental pole magnetic fields.

* * * * *